US005904098A

United States Patent [19]

Theurer et al.

[11] Patent Number: 5,904,098

[45] Date of Patent: May 18, 1999

[54] CRANE CARRYING VEHICLE FOR TRANSPORTING TRACK TIES

[75] Inventors: Josef Theurer, Vienna; Herbert Wörgötter, Gallneukirchen, both of Austria

[73] Assignee: Franz Plasser Bahnbaumaschinen-Industriegesellschaft m.b.H., Vienna, Austria

[21] Appl. No.: 08/846,149

[22] Filed: Apr. 25, 1997

[30] Foreign Application Priority Data

May 21, 1996 [AT] Austria ................................ 898/96

[51] Int. Cl.$^{6}$ ................................ B60P 1/00

[52] U.S. Cl. ................................ 104/2; 104/5; 414/339; 414/547; 414/555

[58] Field of Search ................................ 104/2, 5, 6, 9; 414/339, 546, 547, 555

[56] References Cited

U.S. PATENT DOCUMENTS

| | | | |
|---|---|---|---|
| 3,836,025 | 9/1974 | Olson et al. | 414/547 |
| 4,099,635 | 7/1978 | Leonard et al. | 414/339 |
| 4,128,180 | 12/1978 | Mellious | 414/339 |
| 4,373,856 | 2/1983 | Taylor | 414/555 |
| 4,794,861 | 1/1989 | Theurer et al. . | |
| 4,829,907 | 5/1989 | Theurer et al. . | |
| 4,884,509 | 12/1989 | Theurer et al. . | |
| 4,911,599 | 3/1990 | Theurer et al. | 104/5 |
| 4,955,301 | 9/1990 | Theurer et al. . | |
| 5,193,461 | 3/1993 | Theurer et al. . | |
| 5,511,484 | 4/1996 | Theurer et al. | 104/2 |

*Primary Examiner*—Mark Tuan Le
*Attorney, Agent, or Firm*—Collard & Roe, P.C.

[57] ABSTRACT

A crane carrying vehicle for transporting track ties comprises an elongated machine frame supported on undercarriages for movement on rails in an operating direction, the machine frame comprising a storage section for temporarily storing track ties and having two side walls extending in this direction, the side walls being spaced from each other in a transverse direction extending perpendicularly to the operating direction by a distance corresponding at least to the length of the track ties. A track tie supporting platform in the storage section may be tilted between a horizontally extending loading position and an unloading position extending at an angle to the loading position, and the vehicle carries a power-adjustable pivotal crane outrigger with a gripping device for gripping track ties.

9 Claims, 1 Drawing Sheet

CRANE CARRYING VEHICLE FOR TRANSPORTING TRACK TIES

BACKGROUND OF THE INVENTION

1. Field of the Invention

The present invention relates to a crane carrying vehicle for transporting track ties, which comprises an elongated machine frame extending in a longitudinal direction and supported on undercarriages for movement on rails in this direction, the machine frame comprising a tie transporting section for temporarily storing track ties, and a power-adjustable pivotal crane outrigger with a gripping device for gripping track ties.

2. Description of the Prior Art

Such crane carrying vehicles are known from U.S. Pat. Nos. 4,794,861, 4,829,907, 4,884,509, and 4,911,599. These patents described mobile installations for loading, transporting and unloading as well as exchanging railroad track ties, which are comprised of a plurality of work cars as well as freight cars for transporting worn and new ties, the cars being coupled together in a work train. A track is mounted on top of the side walls of gondola-type freight cars, and a gantry crane as well as a crane carrying vehicle run on the track for movement in the longitudinal direction of the installation. The gantry crane is used for removing the worn ties and discharging them into empty freight cars as well as for bringing new ties to the work cars. The crane carrying vehicle has a power-adjustable crane outrigger with a gripping device, which is used to grip a bundle of new ties in the storage space of a freight car, to hoist it and to place it on a longitudinally extending moving conveyor band for temporary storage. This conveyor band is mounted on a frame connected to the machine frame of the crane carrying vehicle and movable therewith so that it forms a tie transporting section from which the gantry crane periodically removes a layer of temporarily stored track ties and moves them to the working site.

A similar crane carrying vehicle on a tie exchange machine is disclosed in U.S. Pat. No. 5,193,461. A vertically adjustable crane outrigger conveys worn and new ties from and to a tie depositing device on the machine, and the machine frame of the vehicle comprises a section for temporarily storing a small number of ties during their transport by the crane carrying vehicle between the machine and the freight cars.

Finally, U.S. Pat. No. 4,955,301 describes a mobile tie exchange machine with a device for pulling worn ties, a device for inserting new ties and a rotatable crane mounted on the machine frame between these devices. The crane enables the worn ties to be temporarily stored on a section of the machine frame during the tie exchange operation.

SUMMARY OF THE INVENTION

It is a primary object of this invention to provide a crane carrying vehicle of the first-described type, which enables the track tie transport to be carried out with outstanding efficiency.

The above and other objects are accomplished according to the invention with a crane carrying vehicle for transporting track ties, which comprises an elongated machine frame extending in a longitudinal direction and supported on undercarriages for movement on rails in said direction, the machine frame comprising a storage section for temporarily storing track ties and having two side walls extending in said direction, the side walls being spaced from each other in a transverse direction extending perpendicularly to the longitudinal direction by a distance corresponding at least to the length of the track ties. A track tie supporting platform is provided in the storage section, and a drive is operable to tilt the platform between a horizontally extending loading position and an unloading position extending at an angle to the loading position. The vehicle carries a power-adjustable pivotal crane outrigger with a gripping device for gripping track ties.

Such a crane carrying vehicle makes it possible to transport the worn ties coming from a tie exchange operation to be transported rapidly and without problems to freight cars provided for this purpose. The worn ties are placed on the platform at the operating site by the crane outrigger or by any other suitable means, and after the vehicle has been moved to a selected freight car, the platform is simply tilted into the unloading position to throw the worn ties into the freight car. The drive for pivoting the platform may be remote-controlled. This rapid operation does away with the time-consuming and labor-intensive gripping of the individual ties by the gripping device for discharge in the freight car, and alternatively with the regular array of the ties on the platform, to enable them to be gripped by the gripping device in a bundle. The side walls of the storage section have the particular advantage of preventing any lateral sliding of the stored ties off the platform.

According to one preferred feature of the present invention, the outrigger is affixed to the elongated machine frame at one end thereof, and an operator's cab is mounted on the machine frame at an end opposite the one end in the longitudinal direction. The machine frame may define a hatch adjacent the operator's cab, the hatch enabling the gripping device to pass vertically therethrough. This provides an operator an improved view of the operating site and optimizes the working conditions while, at the same time, increasing the safety of the operation.

According to another preferred feature of this invention, the crane outrigger has a telescopingly extensible end to which the gripping device is affixed and comprises a drive for extending the end of the crane outrigger. The gripping device is preferably rotatably affixed to the end of the crane outrigger for rotation about a vertical axis and comprises a drive for rotating the gripping device. Advantageously, the crane outrigger is rotatably mounted on the machine frame for a 360° rotation about a vertical axis and comprises a drive for rotating the crane outrigger. This maximizes the usefulness of the vehicle under different operating conditions.

According to yet another feature of the invention, the machine frame further comprises a loading section arranged between the two side walls. The loading section is preferably comprised of a displaceable plate and comprises a drive for displacing the plate in the longitudinal direction relative to the machine frame, and a guide may glidingly guide the plate, the guide extending in the longitudinal direction. This makes a very efficient manipulation of the new ties possible.

If the rails extend on top of side walls of a freight car extending in the longitudinal direction and are spaced from each other transversely to the longitudinal direction, the safety of the crane carrying vehicle is advantageously enhanced if the undercarriages are jointed cross-shaft axle driving gears.

BRIEF DESCRIPTION OF THE DRAWING

The above and other objects, advantages and features of the present invention will become more apparent from the following detailed description of a now preferred embodiment thereof, taken in conjunction with the accompanying somewhat diagrammatic drawing wherein.

DETAILED DESCRIPTION OF THE PREFERRED EMBODIMENT

Figure 1:
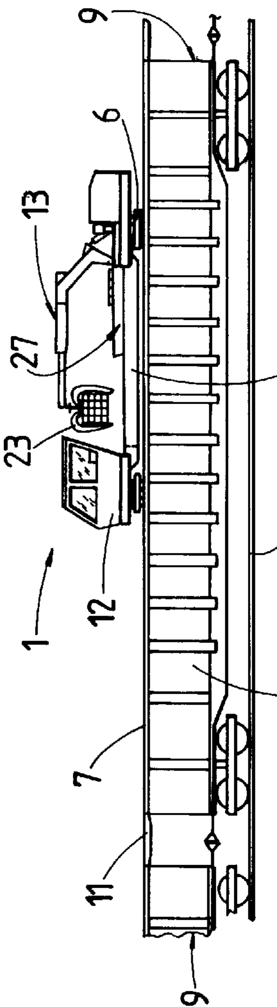
FIG. 1 is a simplified side view of a crane carrying vehicle according to this invention, running on the rails atop the side walls of a freight car.
Figure 2:
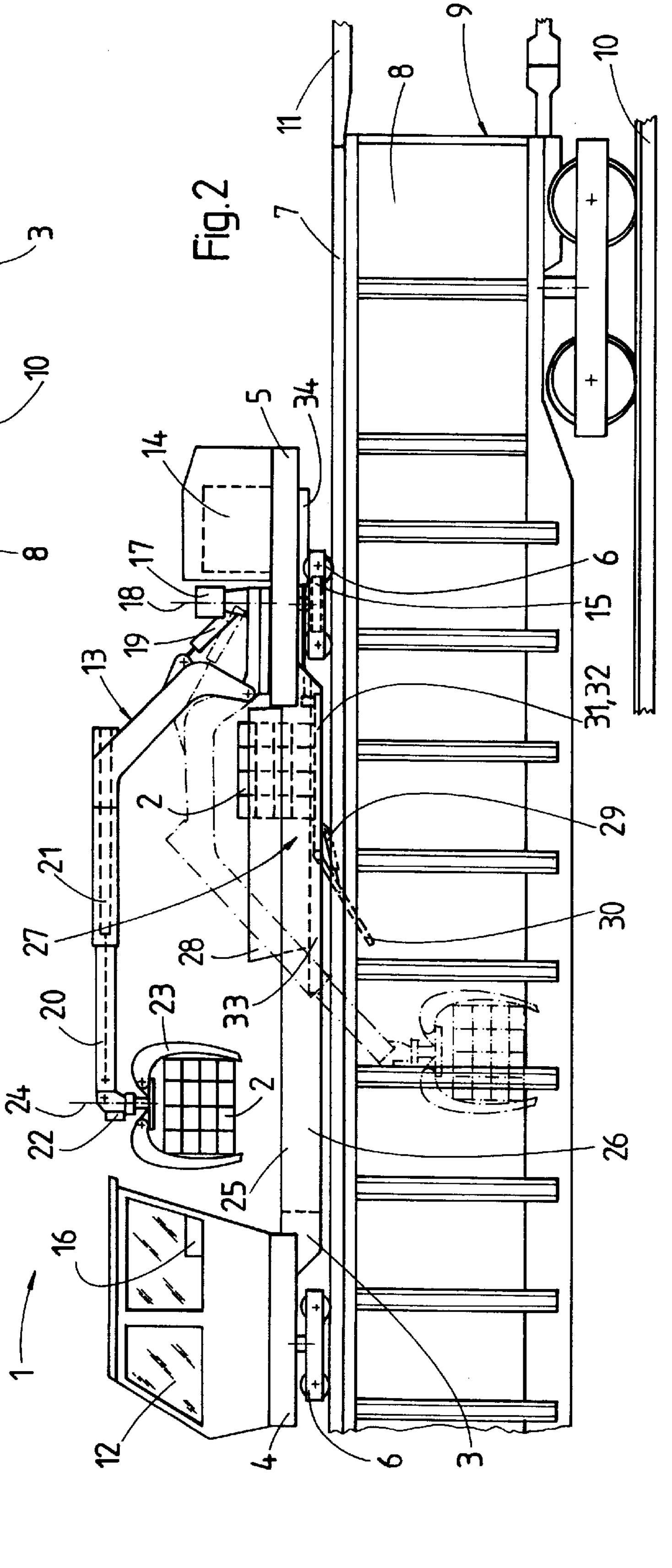
FIG. 2 is an enlarged fragmentary view showing the crane carrying vehicle on the freight car.

As shown in FIGS. 1 and 2, crane carrying vehicle 1 for transporting track ties 2 comprises an elongated machine frame 3 extending in a longitudinal direction and supported at its ends 4, 5 on undercarriages 6 for movement on rails 7 in this direction. In the illustrated embodiment, rails 7 extend on top of side walls 8 of freight car 9 extending in the longitudinal direction and rails 7 are spaced from each other transversely to the longitudinal direction. Undercarriages 6 ate jointed cross-shaft axle driving gears. Freight car 9 may be coupled to other railroad cars, including work cars, to form a tie exchange train running on track 10, and rails 7 extend along the entire length of the train, the rails atop each car being interconnected by connecting rail pieces 11 to the rails atop the adjacent cars.

Power-adjustable pivotal crane outrigger 13 with a gripping device 23 for gripping track ties 2 is affixed to elongated machine frame 3 at end 5 thereof, and operator's cab 12 is mounted on the machine frame at end 4 opposite end 5 in the longitudinal direction. A motor 14 is also mounted on machine frame 3 at end 5 and serves as the power source for drive 15 moving vehicle 1 along rails 7 and for all the other drives on vehicle 1 (to be described hereinafter). These drives are actuated by operating elements 16 in cab 12.

The machine frame defines hatch 26 adjacent operator's cab 12, the hatch enabling gripping device 23 to pass vertically therethrough into and out of the loading space of freight vehicle 9 (see phantom lines in FIG. 2). The crane outrigger has a telescopingly extensible end 20 to which gripping device 23 is affixed, and this crane outrigger end may be extended and retracted by drive 21. Gripping device 23 is rotatably affixed to end 20 of crane outrigger 13 for rotation about vertical axis 24, and drive 22 is arranged to rotate the gripping device. The crane outrigger is rotatably mounted on machine frame 3 for a 360° rotation about vertical axis 18, and drive 17 is arranged to rotate the crane outrigger about axis 18. Drive 19 is linked to an end of crane outrigger 13 opposite end 20 for vertical adjustment of the crane outrigger. Drives 17, 19 and 21 enables crane outrigger 13 to be power-adjusted in all directions.

Machine frame 3 comprises storage section 27 for temporarily storing track ties 2, and the storage section has two side walls 28 extending in the longitudinal direction, the side walls being spaced from each other in a transverse direction extending perpendicularly to the longitudinal direction by a distance corresponding at least to the length of track ties 2. The storage section is equipped with a track tie supporting platform 30, and drive 29 is operable to tilt the platform between a horizontally extending loading position and an unloading position extending at an angle to the loading position. The machine frame further comprises a loading section 31 arranged in the storage section between the two side walls 28. The loading section is comprised of a displaceable plate 32, and drive 34 is arranged to displace plate in the longitudinal direction relative to machine frame 3. The plate 32 is glidingly guided in guide 33 which extends in the longitudinal direction.

Crane carrying vehicle 1 is operated in two stages, i.e. the conveyance of new ties to the operating site and the removal of worn ties from the operating site. During this last-described stage, worn ties 2 are deposited on platform 30 between side walls 28, the universal power adjustment of crane outrigger 13 making a very flexible loading and unloading possible. During this operation, platform 30 is in the horizontal loading position. It is not necessary to array track ties 2 in any special order as they are deposited on platform 30 but they may be temporarily stored on the platform more or less at random without wasting time. After vehicle 1 is moved along rails 7 to a freight car designated to receive the worn ties, platform 30 is tilted into its unloading position shown in phantom lines in FIG. 2 so that track ties 2 stored on the platform may simply glide by the force of gravity through hatch 26 into freight car 9.

In the first-described stage of operation, crane carrying vehicle 1 is moved along rails 7 to a freight car 9 loaded with new ties. As shown in phantom lines in FIG. 2, crane outrigger 13 is now adjusted to move gripping device 23 through hatch 26 into the freight car, to grip a bundle of new ties and to hoist it through the hatch into the position shown in full lines in FIG. 2. Plate 32 is then displaced by drive 34 towards cab 12 to bring it within reach of gripping device 23 so that the bundle of new ties may be placed on plate 32 transport to the operating site.

What is claimed is:

1. A crane carrying vehicle for transporting track ties, which comprises (a) an elongated machine frame extending in a longitudinal direction and supported on undercarriages for movement on rails in said direction, the machine frame comprising
   (1) a storage section for temporarily storing track ties and having two side walls extending in said direction, the side walls being spaced from each other in a transverse direction extending perpendicularly to the longitudinal direction by a distance corresponding at least to the length of the track ties, (b) a track tie supporting platform in said storage section, (c) a drive operable to tilt the platform between a horizontally extending loading position and an unloading position extending at an angle to the loading position, (d) a power-adjustable pivotal crane outrigger with a gripping device for gripping track ties, the outrigger being affixed to the elongated machine frame at one end thereof, and (e) an operator's cab mounted on the machine frame at an end opposite the one end in the longitudinal direction.

2. The crane carrying vehicle of claim 1, wherein the rails extend on top of side walls of a freight car extending in the longitudinal direction and are spaced from each other transversely to the longitudinal direction, and the undercarriages are jointed cross-shaft axle driving gears.

3. The crane carrying vehicle of claim 1, wherein the machine frame defines a hatch adjacent the operator's cab, the hatch enabling the gripping device to pass vertically therethrough.

4. The crane carrying vehicle of claim 1, wherein the crane outrigger has a telescopingly extensible end to which the gripping device is affixed, and comprising a drive for extending the end of the crane outrigger.

5. The crane carrying vehicle of claim 4, wherein the gripping device is rotatably affixed to the end of the crane outrigger for rotation about a vertical axis, and comprising a drive for rotating the gripping device.

6. The crane carrying vehicle of claim 1, wherein the crane outrigger is rotatably mounted on the machine frame for a 360° rotation about a vertical axis, and comprising a drive for rotating the crane outrigger.

7. The crane carrying vehicle of claim 1, wherein the machine frame further comprises a loading section arranged between the two side walls.

8. The crane carrying vehicle of claim 7, wherein the loading section is comprised of a displaceable plate, and comprising a drive for displacing the plate in the longitudinal direction relative to the machine frame.

9. The crane carrying vehicle of claim 8, further comprising a guide glidingly guiding the plate, the guide extending in the longitudinal direction.

* * * * *